May 29, 1962 W. B. TILL 3,036,845
ANTI-JACKNIFING DEVICE
Filed Aug. 18, 1959 2 Sheets-Sheet 1

INVENTOR
WILLIAM BRYAN TILL

May 29, 1962
W. B. TILL
3,036,845
ANTI-JACKNIFING DEVICE
Filed Aug. 18, 1959
2 Sheets-Sheet 2
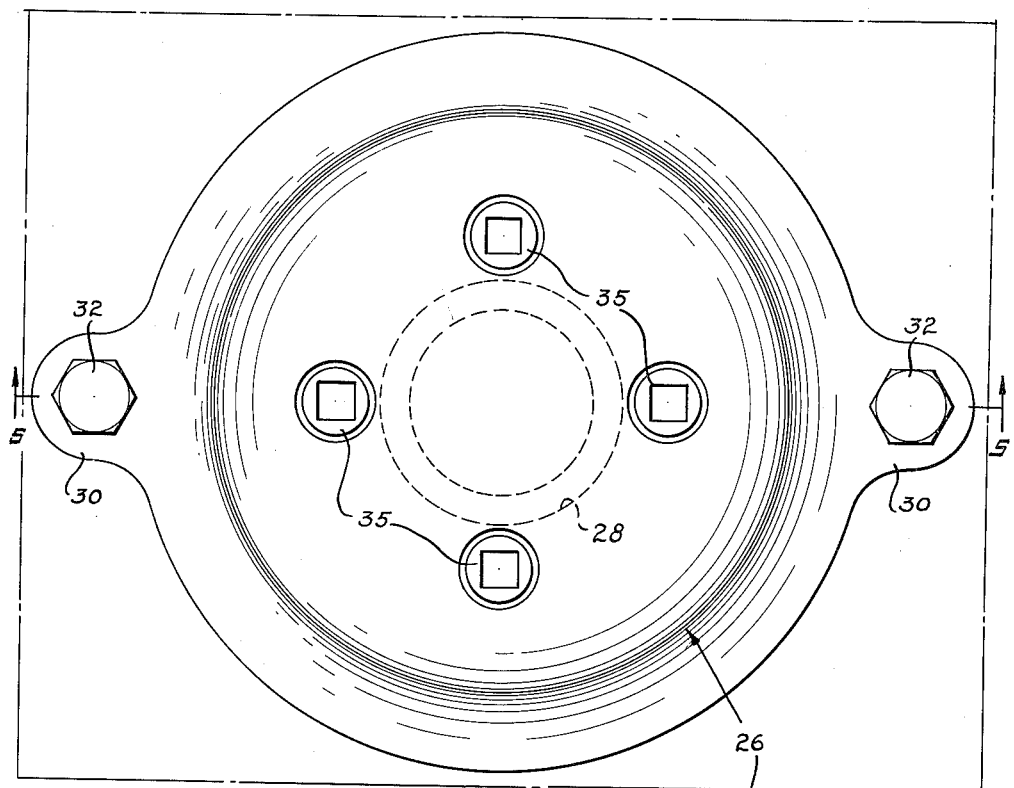
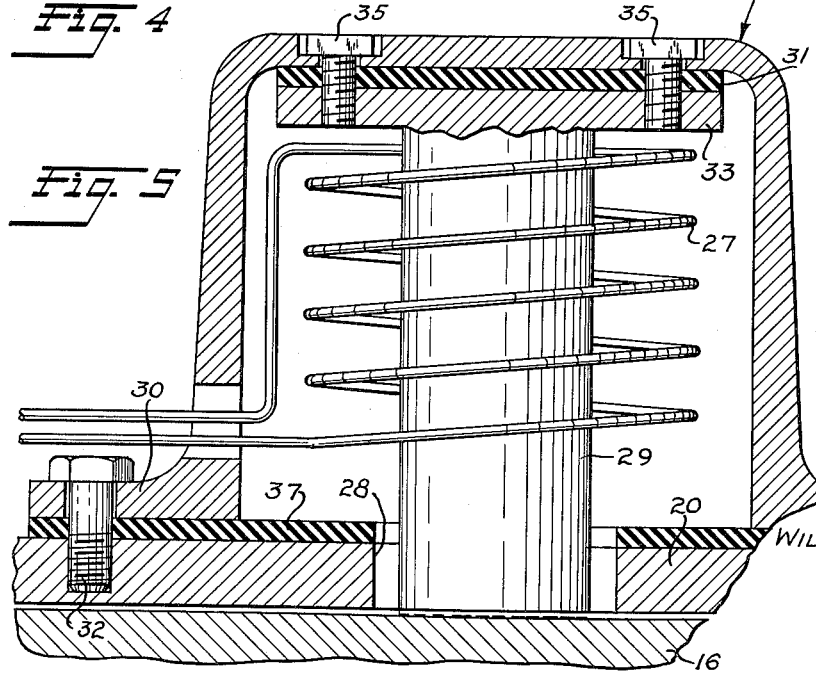
INVENTOR
WILLIAM BRYAN TILL

United States Patent Office 3,036,845
Patented May 29, 1962

3,036,845
ANTI-JACKKNIFING DEVICE
William Bryan Till, Loyall Road, Box 214, Harlan, Ky.
Filed Aug. 18, 1959, Ser. No. 834,443
3 Claims. (Cl. 280—432)

The present invention generally relates to a device for use in combination with an articulated vehicle of the tractor-trailer type and more particularly to a device for preventing jackknifing of the tractor-trailer assembly automatically operated upon application of the brakes.

It is well known in the transportation field that the tendency of a tractor-trailer to jackknife when decelerating is a serious problem and often results in extensive property damage and injury to the driver or drivers of other vehicles that may be damaged by a jackknifed tractor-trailer assembly. This problem is especially troublesome when travelling on slippery road surfaces such as when covered with ice, snow, rain and the like. Therefore, it is the primary object of the present invention to provide a device that will prevent or substantially retard the jackknifing of tractor-trailer assemblies about the articulate connection between the tractor and trailer.

Another object of the present invention is to provide a device for preventing jackknifing which is simple in construction, long lasting, easy to use, easy to install and relatively inexpensive to manufacture and maintain.

Another feature of the present invention is to provide a stabilizer for the articulate connection between a tractor and trailer with the stabilizer being mounted entirely on either the trailer or tractor.

The foregoing and other objectives, advantages, and features of construction will become apparent from a consideration of the following description and the appended drawings.

FIGURE 4 is a top plan view of one of the electromagnets.

FIGURE 5 is a sectional view of the electromagnet taken on the line 5—5 of FIGURE 4.

Figure 1:
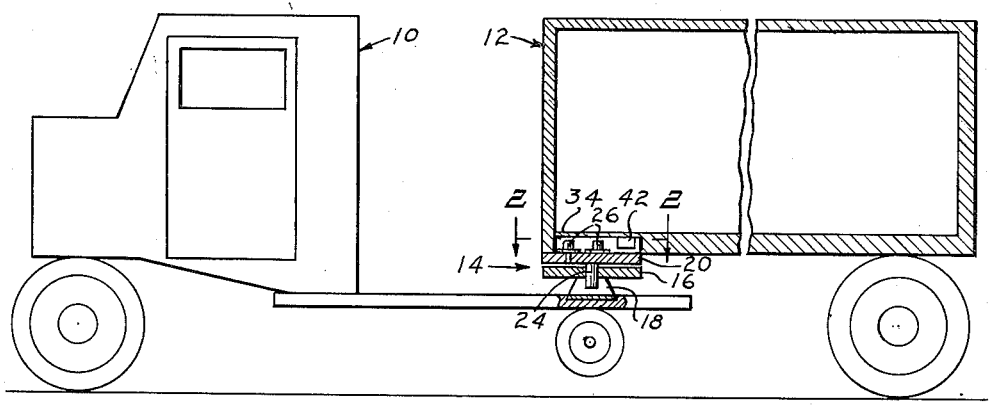
FIGURE 1 is a side elevation, with portions broken away to illustrate the structure of the device, of a tractor-trailer assembly.
Figure 2:
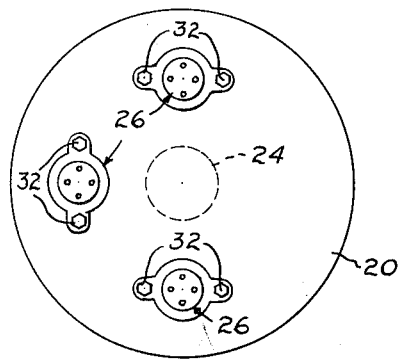
FIGURE 2 is a top plan view of the upper plate.
Figure 3:
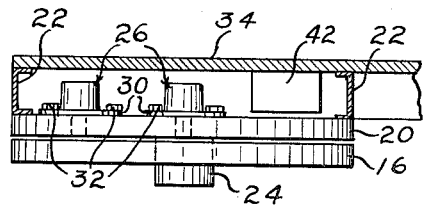
FIGURE 3 is a side elevation of the fifth-wheel assembly with portions broken away to illustrate interior structure of the device.
Figure 6:
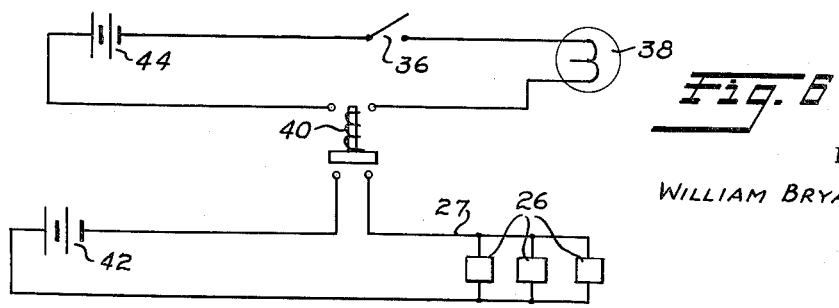
FIGURE 6 is a schematic view of the wiring diagram which illustrates the relation between the brake light circuit and the anti-jackknifing device.

Referring specifically to the drawings, the numeral 10 generally designates a tractor unit and the numeral 12 generally designates a trailer unit of a tractor-trailer assembly in which the units are articulately interconnected by a fifth wheel assembly generally designated by numeral 14. The tractor unit and trailer unit are of conventional construction. The fifth wheel assembly includes the usual lower plate 16 mounted on support brackets 18 for pivotal movement about a transverse axis. The lower plate 16 is of conventional construction and is not modified by the present device.

The upper plate 20 of the fifth wheel assembly 14 is mounted on the transverse rails 22 of the trailer unit 12 in the usual manner such as by conventional welding, fastening bolts or the like. The upper plate 20 also includes a depending king pin 24 which engages the lower plate 16 in the usual manner for pivotally interconnecting the tractor and trailer unit and permitting separation of the tractor and trailer units.

The construction of this invention includes three electromagnets 26 mounted in apertures 28 in the upper plate 20 with the lower ends of the cores 27 of the electromagnets 26 being flush with the lower surface of the upper plate 20. The electromagnets 26 are held in position by supporting lugs 30 and fasteners 32. It is pointed out that the electromagnets 26 are received within the area between the rails 22 and below the floor 34 of the trailer thus protecting the magnets from water, dirt and the like. When the electromagnets are energized the iron cores 27 are urged into engagement with the lower plate whereby friction will prevent or retard relative rotation between the upper and lower plates thereby preventing jackknifing of the trailer in relation to the tractor unit. The torque produced by engagement of the cores with the lower plate in spaced relation to the pivot axis will resist jackknifing of the trailer unit.

As shown in FIGURE 5, the electromagnets 26 are energized when the brake light switch 36 is closed which energises the brake light 38 and also a relay 40 which connects the electromagnets 26 to a source of electrical energy such as a battery 42 which is an auxiliary battery and may be mounted in the closed area provided between the upper plate 20 and the bottom or floor 34 of the trailer unit. The battery 44 is the battery normally provided in the tractor unit for the usual lights, horn, starter and the like. The auxiliary battery 42 is provided solely for energizing the electromagnets 26. The electromagnets 26 will continue to be energized as long as the brakes are applied sufficiently to energize the brake light.

As shown in the sectional view of FIGURE 5, the operation of the electromagnet is as follows: When the brake circuit is closed, current passes through wire 27, magnetizing core 29, and causing a magnetic attraction between core 29 and lower plate 16. Core 29 is normally flush with the lower portion of the upper plate 20, but when magnetized, moves slightly downward to frictionally engage the upper plate 20. This movement can occur as the result of the construction of the electromagnet 26, shown in FIGURE 5. This construction comprises the main housing containing the core 29, said core being attached to a plate 33 at it's top portion, a spacer member 31 composed of rubber, fiber or other non-conducting material between said plate 33 and the top of said housing, and attached thereto by non-conducting bolts 35. The lugs 30 and the lower edge of the housing are spaced from the plate 20 by a resilient member 37, composed of rubber, plastic or other resilient material, and are held in said relation by bolts or fasteners 32, which are threaded into apertures in plate 20. Thus, the resilient material 37 will allow the core of the electromagnet to move slightly downward to frictionally engage the plate 16 when the magnet is energized, a slight compression of said material occurring between the lugs 30 and the plate 20 to allow said core to move downwardly.

The entire device is mounted on the trailer unit thus enabling any tractor unit to be attached to the trailer unit thereby providing a high degree of flexibility in the operation of a fleet of trucks. The mounting of the device under the upper plate does not require any payload space and protects the unit from weather, road scum, dirt and the like. The electromagnets 26 are arranged in a triangular pattern about a center formed by the king pin. The mounting lugs for the electromagnets 26 are disposed on the housings for the magnets.

It is pointed out that the electric energy may also be obtained from the tractor unit battery and the number of electric magnets may vary.

While this invention has been described in a specific form and as operating in a specific manner for the purpose of illustration, it is to be understood that the invention is not limited thereto, since various modifications will suggest themselves to those skilled in the art without departing from the spirit of this invention, the scope of which is set forth in the annexed claims:

I claim:

1. In a tractor and trailer assembly of the type in which the trailer is articulately connected with the tractor, a fifth wheel of the tractor comprising a plate with an upper surface, a fifth wheel of the trailer comprising a plate arranged to overlie the fifth wheel plate of the tractor, the fifth wheel plate of the trailer having a king pin depending therefrom and arranged for connection with the fifth wheel plate of the tractor whereby the trailer is connected with the tractor for relative turning movement between the tracor and the trailer, a pluraliy of apertures formed in the fifth wheel plate of the trailer and arranged in spaced relation about a center from the king pin, an electromagnet mounted in each said aperture of the trailer fifth wheel plate with the lower end of the core of said electromagnet overlying the upper surface of the fifth wheel plate of the tractor, and means for energizing said electromagnets to urge the cores thereof into frictional engagement with the upper surface of the fifth wheel plate of said tractor whereby relative turning movement between the fifth wheel plate of the trailer and the fifth wheel plate of the tractor is retarded.

2. In a tractor and trailer, the tractor having a fifth wheel comprising a plate with a substantially unobstructed upper surface and the trailer having a fifth wheel plate arranged to overlie the fifth wheel plate of the tractor, the fifth wheel plate of the trailer having a king pin depending therefrom and arranged for connection with the fifth wheel plate of the tractor whereby the trailer is connected with the tractor for relative turning movement between the tractor and the trailer, a plurality of apertures formed in the fifth wheel plate of the trailer and arranged in a triangular pattern about a center from said king pin, an electromagnet mounted in each said aperture of the fifth wheel plate of the trailer with the lower end of the core of said electromagnet arranged substantially flush with the lower surface of the fifth wheel plate of the trailer when the electromagnet is deenergized, and means for energizing said electromagnets to thereby urge the cores thereof into frictional engagement with the upper surface of the fifth wheel plate of said tractor whereby relative turning movement between the fifth wheel plate of the trailer and the fifth wheel plate of the tractor is retarded by magnetic force.

3. In a tractor and trailer, the tractor having a fifth wheel plate, the trailer having a fifth wheel plate arranged in face to face relationship with the fifth wheel plate of the tractor, a king pin connecting said fifth wheel plates whereby the fifth wheel plate of the trailer is arranged for relative turning movement with respect to the fifth wheel plate of the tractor, a plurality of apertures formed in one of said fifth wheel plates and arranged in spaced apart relationship in a triangular pattern about a center from said king pin, an electromagnet mounted in each said aperture with the end of the core of said electromagnet arranged substantially flush with the surface of said apertured fifth wheel plate in face to face relationship with the other fifth wheel plate when the electromagnet is deenergized, and means for energizing said electromagnets to thereby urge the cores thereof into frictional engagement with the face of the other fifth wheel plate whereby relative turning movement between the two fifth wheel plates is retarded solely by magnetic force.

References Cited in the file of this patent

UNITED STATES PATENTS

| 634,666 | Hooper | Oct. 10, 1899 |
| 2,454,626 | Borzell | Nov. 23, 1948 |
| 2,528,076 | Plaxco | Oct. 31, 1950 |
| 2,613,946 | Anderson | Oct. 14, 1952 |

FOREIGN PATENTS

| 902,223 | Germany | Jan. 21, 1954 |